Sept. 9, 1941.  J. P. BURKE  2,255,650

SELF-ANCHORING NUT

Filed Feb. 3, 1940

INVENTOR.
James P. Burke
BY Windsor Davis
ATTORNEY.

Patented Sept. 9, 1941

2,255,650

UNITED STATES PATENT OFFICE 2,255,650

SELF-ANCHORING NUT

James P. Burke, Knoxville, Tenn., assignor to Bert L. Quarnstrom and F. L. McLaughlin, both of Detroit, Mich.

Application February 3, 1940, Serial No. 317,092

2 Claims. (Cl. 85—32)

This invention relates to self clinching or crimp nuts and has for its primary object to provide a nut adapted to be inserted into an opening in a supporting member and having laterally expansible means adapted to be projected laterally outwardly therefrom, when a bolt is tightened therein, for preventing withdrawal of the nut from the opening.

More specifically, the main object of the invention is to provide a nut of this character which is formed of a single piece of sheet metal. In this respect a single piece of sheet metal is formed by conventional metal pressing and punching machinery to provide an abutment portion, a laterally expansible portion and an internally threaded portion, the internally threaded portion being connected to the expansible portion by a conical portion which acts in the presence of compression forces between the screw-threaded and abutment portions to cause lateral expansion of the expansible portion.

Another object is to provide a nut of the type above mentioned having snap fastener means by which it may be retained in an opening while the member which supports it is being transported from place to place.

Figure 1:
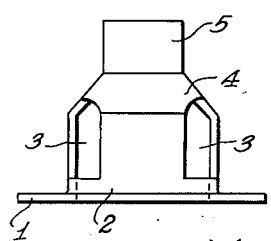
Figure 2:
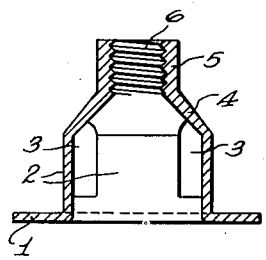
Figure 3:
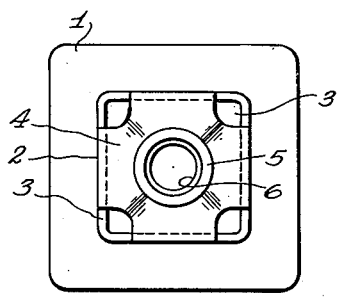
Figure 4:
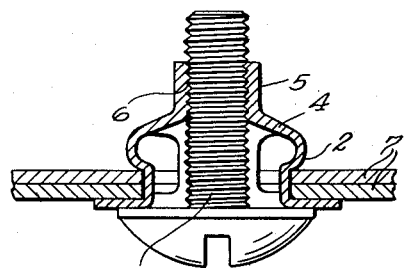
Figure 5:
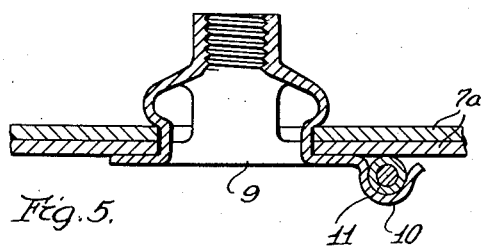
Figure 6:
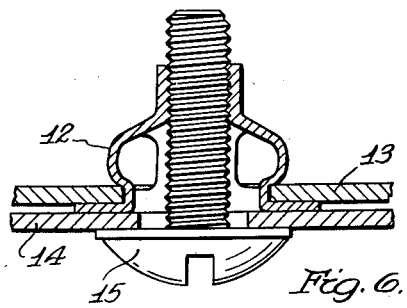
Figure 7:
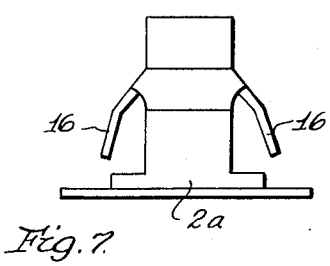
Figure 8:
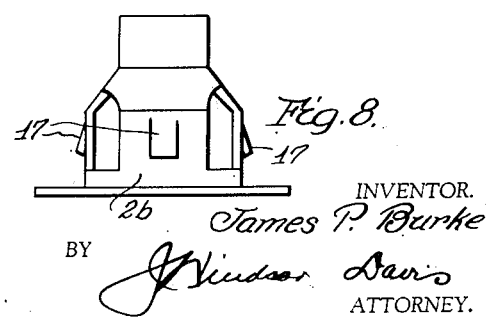

Other objects and advantages will become more fully apparent as reference is had to the accompanying drawing wherein my invention is illustrated, and in which Fig. 1 is a side elevation of a nut, Fig. 2 is a vertical cross-section, Fig. 3 is a plan view, Fig. 4 is a cross section illustrating the nut in use, Fig. 5 is a section illustrating the nut functioning in a manner similar to a rivet, and having article supporting means formed integral therewith, Fig. 6 is a cross section illustrating an alternate mode of using the nut, and Figs. 7 and 8 are elevations illustrating alternative snap fastener means.

More particularly, I designates the abutment portion of the nut, having a hollow, substantially square portion 2 arising therefrom. It is not essential that this portion be square, and it is shown as square merely by way of example. It is essential, however, that it be other than round shape so that the nut will not turn when it is inserted in an aperture in a supporting member.

The portion 2 is weakened by removing portions thereof to form holes 3. In the case of a square nut such as shown it is preferred that these holes 3 be formed at the corners thereof as shown.

The portion 2 constitutes a laterally expansible means, and is connected by a conical portion 4 to an internally threaded portion 5. In forming the nut of sheet metal, the blank is first extended to form the portion 4 and is then compressed by a "bump-back" step to form the relatively smaller cylindrical portion 5. This method of forming the nut has an advantage in that the "bump-back" results in a thickening of the walls of the portion 5, and a partial thickening in the conical portion 4. This provides an abundant thickness for the threads 6, which are formed by a subsequent tapping operation, and also provides for strengthening the upper region of the conical portion 4. The conical portion 4 gradually thickens upwardly and its weakest point is at the juncture with the portion 2.

As shown in Fig. 4, the nut may be placed through apertures in two sheet metal members 7, a bolt 8 may be inserted therein, by tightening the bolt 8 the conical portion 4 forces the portion 2 outwardly laterally, and the portion 2 will prevent withdrawal of the nut from the openings.

Inasmuch as the nut and assembly shown in Fig. 5 is similar to that above described it is generally designated by the numeral 9. It illustrates that the nut may be employed in the nature of a rivet, for securing the two members 7a together when the bolt which collapsed it is removed. Formed integral with the nut 8 is a retainer 10 which may be employed for supporting a cable 11 or any other similar article.

The nut 12 shown in Fig. 6 is identical to the nut first described. In this case, however, the nut is retained upon one supporting member 13 and the other member 14 is secured thereto by the bolt 15. This illustrates that the nut may be used in such manner that the two connected members may be separated by removing the bolt, which is not the case as shown in Figs. 4 and 5.

In order that the nut may retain itself in an aperture in a supporting member snap fastener means is provided. As shown in Fig. 7 this means may be formed by shearing two of the side portions of the portion 2a and bending them outwardly to form spring fingers 16. These fingers 16 compress when the nut is inserted in an aperture in a supporting member and then snap outwardly to engage the inner face of the supporting member. An alternative form of snap fastener means may be provided by forming the sides of the portion 26 shown in Fig. 8 with outwardly projecting spring fingers 17.

Although specific embodiments of the invention have been illustrated and described, it will be understood that various changes may be made within the scope of the appended claims without departing from the spirit of the invention, and such changes are contemplated.

What is claimed is:

1. A sheet metal nut comprising an abutment portion, a hollow expansible portion arising from said abutment portion, said expansible portion being of substantially square shape with portions removed at the corners thereof to weaken the same, a frusto-conical portion integral with and converging upwardly from said expansible portion, and an internally threaded portion integral with and arising from said frusto-conical portion, two of the sides of said expansible portion being severed and bent outwardly to constitute snap fastening spring fingers.

2. A nut comprising an abutment portion, a pair of parallel arms arising from said abutment, said arms being joined at their outer ends by an integral substantially frusto-conical portion, an internally threaded tubular portion integral with the outer and smaller end of said frusto-conical portion, and a pair of parallel arms arranged at right angles to the first named arms, said second pair of arms being integrally connected with said frusto-conical portion and extending therefrom in a direction both radially outwardly and toward said abutment portion.

JAMES P. BURKE.